(12) United States Patent
Campion et al.

(10) Patent No.: US 6,532,775 B1
(45) Date of Patent: Mar. 18, 2003

(54) METHOD OF DEPOSITING A LAYER OF SILICA FOLLOWED BY A STEP OF ADDING DOPANT TO THE LAYER

(75) Inventors: Jean-Florent Campion, Bois Colombes (FR); Jean-Maxime Saugrain, Le Vesinet (FR); Christelle Lavallade, Courdimanche (FR); Jean-François Chariot, Marly le Roi (FR); Rémi Fauche, Acheres (FR); Jacques Jolly, Saint Ouen L'Aumone (FR); Pierryle Jourdier, Paris (FR); Rosine Meilleur, Montigny le Bretonneux (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/402,252

(22) PCT Filed: Feb. 11, 1999

(86) PCT No.: PCT/FR99/00303
§ 371 (c)(1),
(2), (4) Date: Oct. 1, 1999

(87) PCT Pub. No.: WO99/41207
PCT Pub. Date: Aug. 19, 1999

(30) Foreign Application Priority Data

Feb. 12, 1998 (FR) .............................................. 98 01677

(51) Int. Cl.$^7$ ............................................ C03B 37/018
(52) U.S. Cl. ............................. 65/391; 65/399; 65/421
(58) Field of Search ........................... 65/421, 391, 399

(56) References Cited

U.S. PATENT DOCUMENTS

| | | | | |
|---|---|---|---|---|
| 4,011,006 A | * | 3/1977 | Fleming ...................... | 65/391 |
| 4,265,649 A | * | 5/1981 | Achener ...................... | 65/391 |
| 4,378,987 A | * | 4/1983 | Miller ......................... | 65/421 |
| 5,151,117 A | * | 9/1992 | Bartholomen ............... | 65/421 |
| 6,202,447 B1 | * | 3/2001 | Drouart ....................... | 65/391 |

FOREIGN PATENT DOCUMENTS

| | | |
|---|---|---|
| DE | 32 06 180 A1 | 8/1983 |
| EP | 0 086 132 A1 | 8/1983 |
| EP | 0 360 479 A2 | 3/1990 |
| EP | 0 578 553 A1 | 1/1994 |
| FR | 2 446 264 | 8/1980 |

OTHER PUBLICATIONS

Patent Abstracts of Japan, vol. 96, No. 5, May 31, 1996 corresponding to JP 08 026763 A(NT&T Corp) Jan. 30, 1996.

* cited by examiner

*Primary Examiner*—John Hoffman
(74) *Attorney, Agent, or Firm*—Sughrue Mion, PLLC

(57) ABSTRACT

A method of manufacturing an optical fiber preform (3) comprising: forming at least one silica-based outer deposition layer (23) by depositing silica on a primary preform (24) constituted by a bar mainly comprising silica and including a silica-based outer peripheral portion (22), the method being characterized in that the viscosity of the outer deposition layer (23) is adjusted to be substantially identical to the viscosity of the outer peripheral portion (22) of the primary preform (24) by adding to the silica, over a substantial portion of the outer deposition layer (23), at least one compound selected from the group formed by the following compounds: $CaF_2$, $MgF_2$, $AlF_3$, $B_2O_3$, and $Al_2O_3$.

7 Claims, 3 Drawing Sheets

METHOD OF DEPOSITING A LAYER OF SILICA FOLLOWED BY A STEP OF ADDING DOPANT TO THE LAYER

BACKGROUND OF THE INVENTION

The invention relates to a method of manufacturing an optical fiber preform, the method comprising forming at least one silica-based external deposition layer by depositing silica on a primary preform consisting in a bar mainly comprising silica and including a silica-based outer peripheral portion.

In known manner, external deposition is performed on a primary preform, e.g. as shown in FIG. 1 which relates to plasma build-up, in order to enlarge the diameter of the preform, thereby increasing the length of the optical fiber, as shown in FIG. 2, which can be made by hot drawing the resulting preform. The primary preform, whether it is made by the modified chemical vapor deposition (MCVD) technique or by the vapor axial deposition (VAD) technique, is a bar mainly comprising silica and including an outer peripheral portion which is based on silica, said outer peripheral portion usually consisting in a silica-based tube forming the side wall of the primary preform, with said bar comprising, inside the outer peripheral portion, optical cladding and a core which have different refractive indices. Silica, generally in the form of a silica grains when the external deposition is performed by plasma build-up, is deposited on the silica-based outer peripheral portion of the primary preform so that the build-up layer has substantially the same refractive index as said peripheral portion.

FIG. 1 shows, in highly diagrammatic manner, plasma build-up apparatus comprising an enclosure 1 having a transparent window 2, a preform 3 of longitudinal axis X seen end-on, and onto which there are directed a plasma torch 4 and a nozzle 5 for supplying build-up grains. Outside the enclosure 1, a CCD camera 6 located behind the window 2 is directed towards the preform 3. It provides a measurement of the diameter of the preform at the location towards which it is pointed and in the form of a value which is transmitted over a link 7 to apparatus 8 for controlling the build-up process. Over a multiple link 9, the apparatus 8 also receives other indications about build-up process conditions. Under the effect of an internal program for controlling the build-up process, and at constant grain feed rate, the apparatus 8 delivers over an outlet link 10 connected to a control apparatus 11, a control value for positioning the nozzle 5 relative to the preform 3 so that the nozzle 5 is positioned accordingly by being displaced along an axis parallel to the longitudinal X of the preform 3. Over a multiple output link 12, the apparatus 8 also delivers other control values that govern other aspects of the control process.

All of the elements of the apparatus shown in FIG. 1 are well known to the person skilled in the art. Other elements (not shown) are also well known. This applies to means for supporting the preform 3 while enabling it to be driven in rotation and in translation, a carriage for supporting the plasma torch 4 and the nozzle 5, and suitable for being driven in translation parallel to the longitudinal axis of the preform 3, and means for evaluating the angular position of the preform 3 and the longitudinal position of the carriage, e.g. as described in European patent application EP-A1-0 440 130. In conventional manner, these means together enable the preform 3 to be moved away from the torch 4 as the preform 3 becomes larger. Means for directing the camera 6 to successive locations on the preform 3 during a measurement pass likewise form part of the prior art and can be constituted by a second carriage whose displacement is coupled to that of the first carriage.

Plasma build-up takes place in passes, from right to left and then from left to right, during which the plasma torch 4 and the nozzle 5 scan the length of the preform 3.

The entire control process is optimized so as to obtain high yield concerning the quantity of silica deposited at a given speed of translation and for a given refractive index for the build-up layer.

Simultaneously, the camera 6 performs a measurement pass, providing successive values for the diameter of the preform 3 along its entire length. In order to simplify matters, it is preferable for the camera 6 to perform measurement only on every other pass, e.g. on the right to left pass, while during the following pass the output from the camera 6 is not enabled.

FIG. 2 is a diagrammatic section view through an optical fiber 15 made by hot drawing down of a preform 3 obtained by a silica-based external deposition method applied to a primary preform 24, e.g. a preform made by the MCVD method. The layers of the optical fiber 15 and of the preform 3 correspond, ignoring scale, so the same numerals 20 to 24 are used both for the preform 3 and for the optical fiber 15 shown in FIG. 2. The primary preform 24 comprises an optical core 20, cladding 21, and an outer peripheral portion 22. The primary preform 24 is made using the MCVD method by internal deposition of optionally-doped silica-based layers forming the optical core 20 and the optical cladding 21 inside the tube 22, followed by the tube that has been internally coated in this way being transformed into a bar by being collapsed, which bar constitutes the primary preform 24, after which the final preform 3 is made by external silica-based deposition of external deposition layers 23 deposited on the primary preform 24.

The problem which arises is that of obtaining an optical fiber having a refractive index that is constant throughout its thicknesses which is scaled, during the hot drawing operation, from both the silica-based outer deposition layer and the silica-based outer peripheral portion of the primary preform. It has been observed that an undesirable index step is to be found in the optical fiber that results from hot drawing of the preform, said step being located (ignoring scale) at the boundary between the outer peripheral portion and the silica-based outer deposition layer, said outer peripheral portion apparently not being subjected to the same compression stresses during hot drawing as is the outer deposition layer.

SUMMARY OF THE INVENTION

To this end, the invention provides a method of manufacturing an optical fiber preform comprising: forming at least one silica-based outer deposition layer by depositing silica on a primary preform constituted by a bar mainly comprising silica and including a silica-based outer peripheral portion, the method being characterized in that the viscosity of the outer deposition layer is adjusted to be substantially identical to the viscosity of the outer peripheral portion of the primary preform by adding to the silica, over a substantial portion of the outer deposition layer, at least one compound selected from the group formed by the following compounds: $CaF_2$, $MgF_2$, $AlF_3$, $B_2O_3$, and $Al_2O_3$.

Preferably, if the dopant is selected from the group constituted by $CaF_2$, $MgF_2$, and $AlF_3$, the proportion of the dopant lies in the range 5 ppm to 100 ppm, preferably in the range 10 ppm to 40 ppm, by weight of the fluorided element (i.e. the calcium, the magnesium, or the aluminum) relative to silica. It is necessary to have sufficient dopant in order to obtain a significant effect on viscosity. Furthermore, if the proportion of said dopant is excessive, a problem is observed concerning the stability of the diameter of the optical fiber manufactured from the preform, and also variation of the index around the nominal value can be too great compared with the tolerance range set by the manufacturer.

Preferably, if the dopant is selected from the group formed by $B_2O_3$ and $Al_2O_3$, the proportion of dopant lies in the range 0.01% to 1%, preferably in the range 0.1% to 0.6%, by weight of the oxidized element (i.e. the boron or the aluminum) relative to the silica. It is necessary to have sufficient dopant to obtain a significant effect on viscosity. Furthermore, if the proportion of said dopant is excessive, there is observed, on the contrary, a new index step because the dopant has softened the silica excessively.

In an implementation of the invention, the silica is in the form of grains of a size generally lying in the range 50 μm to 300 μm.

By doping the silica with a dopant in the above-described preferred proportions, an external deposition layer is formed which possesses viscosity during hot drawing that is substantially equal to that of the outer peripheral portion of the primary preform, thus leading to drawing which is uniform in a plane extending transversely to the preform, the silica-based outer peripheral portion and the outer deposition layer being in substantially the same stress state. As a result, the thicknesses of optical fiber scaled from the build-up layer and from the silica-based outer peripheral portion retain the same refractive index.

Advantageously, the proportion of dopant(s) used is such that dopant diffusion through the silica-based outer peripheral portion in the cladding and in the core of the optical fiber is not significant in terms of having a prejudicial effect on optical attenuation properties.

The dopant is preferably supplied in a proportion relative to that of silica that enables the viscosity of the build-up layer and of the outer peripheral portion of the primary preform to be adjusted without significantly modifying the refractive index of the build-up layer relative to that of said silica-based outer peripheral portion.

BRIEF DESCRIPTION OF THE DRAWING

Other characteristics and advantages of the invention will appear on reading the following description of a particular implementation, illustrated by FIGS. 1 to 5, for the case of two different dopants, namely: alumina and calcium fluoride.

DETAILED DESCRIPTION OF THE INVENTION

Figure 1:
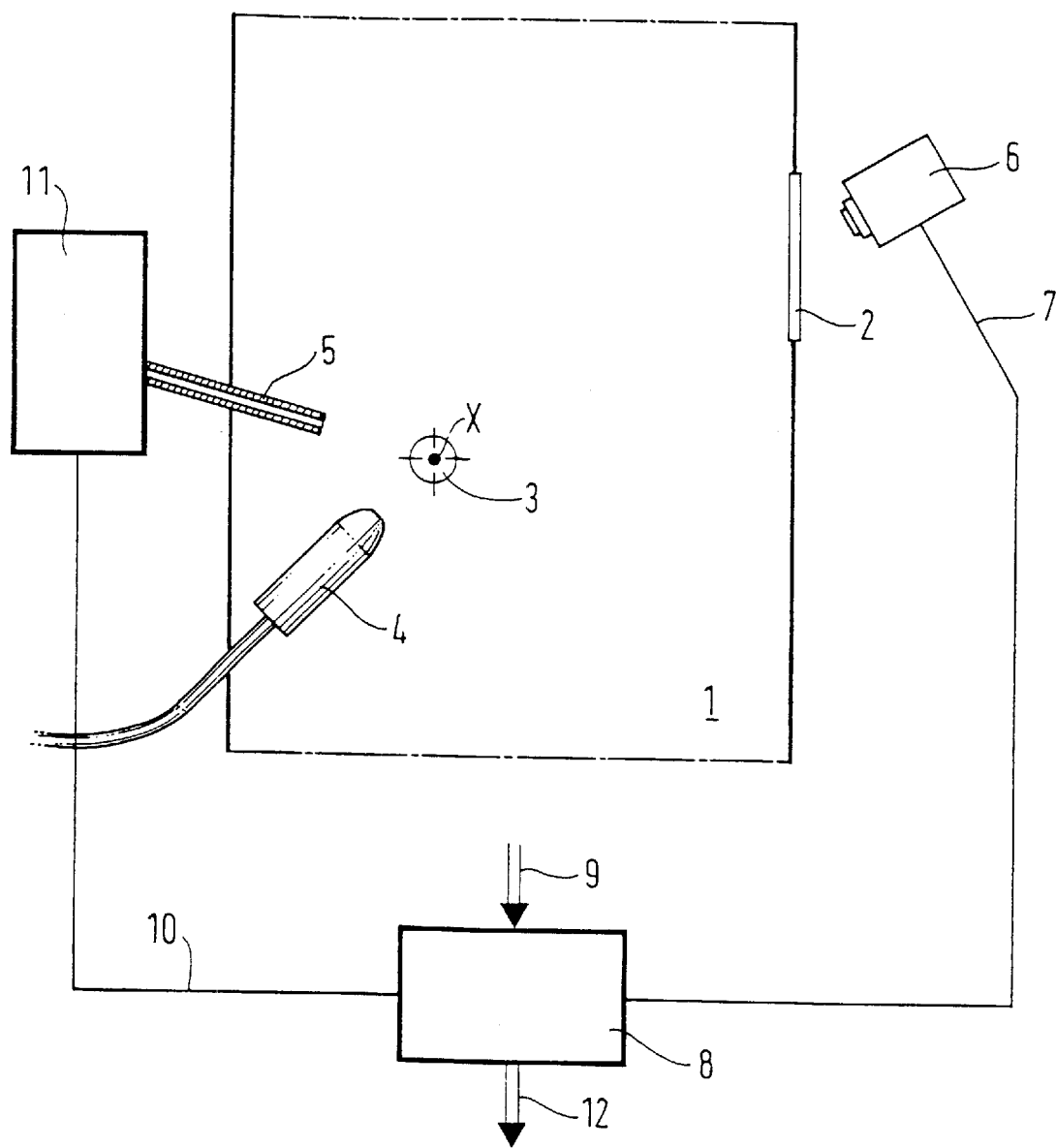
FIG. 1, described above, is a highly diagrammatic representation of plasma build-up apparatus in which the method of the invention can be implemented.

In the examples below, a method of building up a primary preform is performed in a particular implementation of the invention, as illustrated by above-described FIG. 1, by means of a build-up bench which comprises a lathe holding a primary preform 24 and subsequently a built-up preform 3 which are cylindrical and which are supported to revolve about their own axis, together with a plasma torch 4 whose axis is perpendicular to the axis X of the preform. The plasma torch 4 can move in translation and it is displaced parallel to the preform 3 in order to preheat it.

Figure 2:
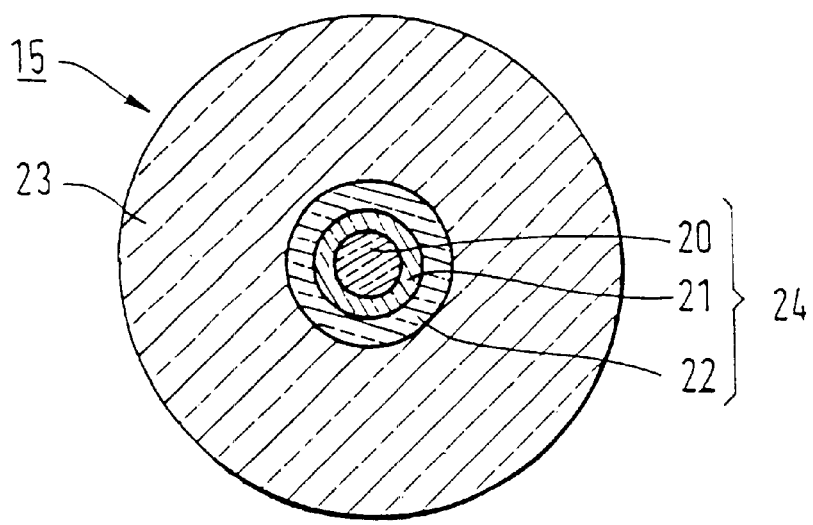
FIG. 2, described above, is a diagrammatic section view of an optical fiber that can be obtained by the method of the invention, starting from a primary preform, e.g. made using the MCVD method.

The primary preform 24 comes from an MCVD type method and is shown in above-described FIG. 2. It is constituted by a silica-based outer peripheral portion 22 in the form of a silica tube having optical cladding 21 and a core 20 deposited therein. It is preferable to use a tube 22 of ultra pure silica in order to improve the attenuation properties of the optical fiber 15 manufactured from the preform 3.

A build-up layer 23 begins to be formed when silica is deposited in the form of grains on the silica tube 22 of the primary preform 24. In the presence of the plasma, the silica grains are merely deposited under gravity from a feed duct constituted by the nozzle 5 which is moved in translation parallel to the primary preform 24. The silica grains are melted and then vitrified at a temperature of about 2300 degrees Celsius (° C.) by the plasma. The build-up operation takes place in a closed cubicle to provide protection against electromagnetic disturbances and against the ozone given off by the plasma torch 4.

According to the invention, particles of dopant, either alumina or calcium fluoride, are deposited simultaneously, said particles being mixed with the grains of silica in the feed duct 5. It is also possible to deliver the silica via a first feed duct and the particles of dopant via a second feed duct that opens out close to the plasma torch 4 quite close to the first duct 5 for feeding silica. As mentioned above, the introduction of dopant particles into the build-up layer 23 gives this layer viscosity that is substantially equal to that of the outer peripheral portion 22 of the primary preform, i.e. the silica tube, during the hot drawing operation that is used in making an optical fiber 15.

The particles of dopant are introduced at a proportion relative to that of the silica grains which is a function of the purity of the silica grains and of the tube 22 of the primary preform 24.

EXAMPLE 1

Using Alumina 0.1% of alumina $Al_2O_3$ particles by weight of the oxidized element, i.e. aluminum, relative to the natural silica is used when building up the primary preform 24 which has the tube 22 of ultra pure silica. Under such conditions, a built-up layer 23 is obtained whose viscosity during hot drawing is substantially equal to that of the tube 22 of the primary preform 24.

Provision is made to use alumina particles of ultra pure quality of maximum size that is typically a few tens of micrometers (μm). Preferably, pyrogenic alumina particles are used of a size that is smaller than 50 μm so as to enhance uniform distribution of the particles in the build-up layer 23.

Figure 3:
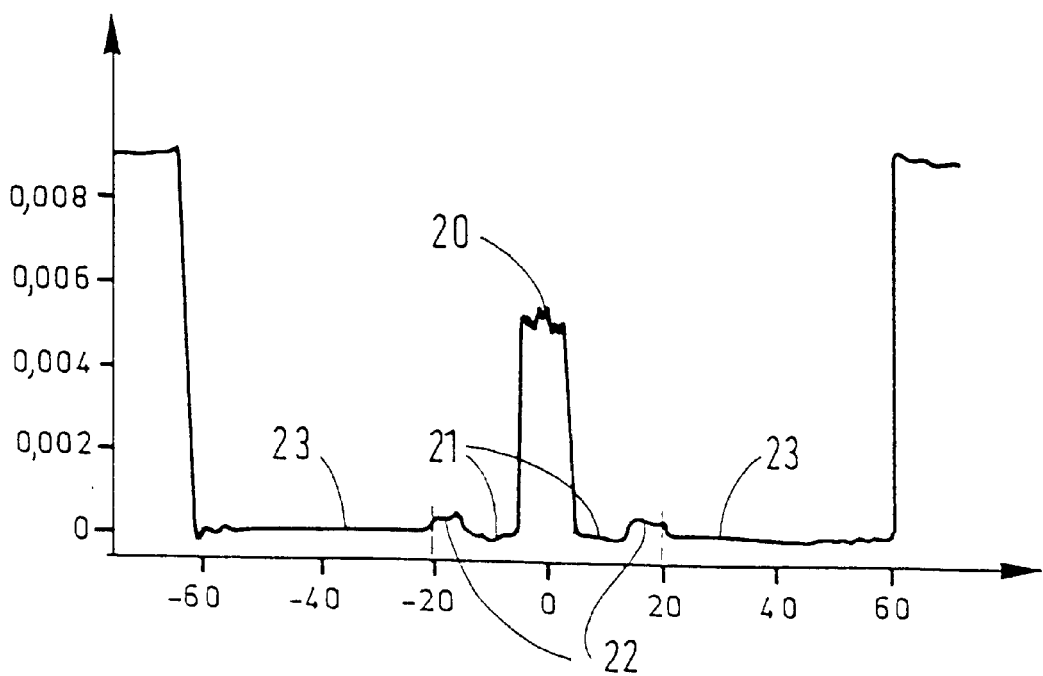
FIG. 3 shows the index profile of an optical fiber hot drawn from a prior art preform having a non-doped silica-based outer deposition layer.
Figure 4:
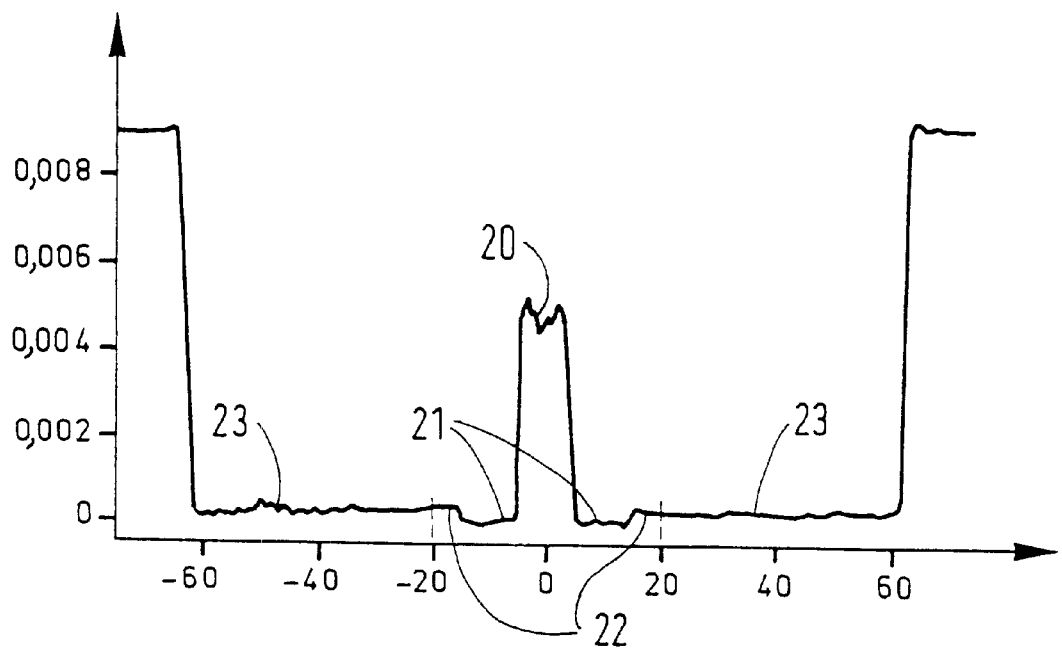
FIG. 4 shows the index profile of an optical fiber hot drawn from a preform having a silica-based outer deposition layer that is doped with alumina in accordance with the invention.

A refractive index profile, i.e. a curve whose abscissa represents distance from the center of the fiber 15 in μm, and whose ordinate represents refractive index value, is given in both FIG. 3 and in FIG. 4, where the optical fiber 15 was hot drawn from a built-up primary preform 3 respectively in accordance with the prior art and in accordance with the invention. The silica tube 22 of the primary preform 24 contained 1200 parts per million (ppm) of chlorine, and the build-up layer 23 was constituted by grains of natural silica.

In the first case, as shown in FIG. 3, the build-up layer 23 was based on non-doped silica. It can be seen that for a given optical fiber 15, the index profile has a step at about 20 μm from the center of the optical fiber 15, which corresponds to the interface between the two thicknesses as scaled from the build-up layer 23 and the silica tube 22. The portions of the index profile due to the core 20 and to the cladding 21 are also shown in FIG. 3.

In the second case, as shown in FIG. 4, which in the same manner as FIG. 3 shows the index profiles of the portions 20, 21, 22, and 23 of the optical fiber 15, the natural silica grains of the build-up layer 23 were doped to 0.1% with pyrogenic alumina. It can be seen that the index profile is substantially flat around 20 μm from the center of the optical fiber 15, and that the index step observed in FIG. 3 has substantially disappeared. This result shows the influence of the alumina fed to the build-up layer 23 in respect of conserving the same refractive index between those thicknesses of the optical fiber 15 that are scaled from said build-up layer 23 and those that are scaled from the silica tube 22 of the primary preform 24 during hot drawing.

Provision is also made to introduce alumina particles in the form of synthetic silica grains that have been highly doped with alumina, to the extent of about 30% by weight, thereby making it possible to incorporate the alumina in a silica lattice prior to deposition, and thus improving the uniformity of the build-up layer 23.

In addition, introducing particles of $Al_2O_3$, or $AlF_3$ or indeed $B_2O_3$ in the build-up layer 23 advantageously reduces attenuation losses due to the presence of hydrogen in the optical fiber 15.

By way of example, an optical fiber 15 made from a preform 3 that was built-up without using alumina particles, and that was tested under standardized conditions of external hydrogen pressure, presented attenuation at 1.55 μm going from 0.1 decibels per kilometer (dB/km) to 0.5 dB/km. In the presence of alumina particles in the build-up layer 23 of the preform 3 in the proportions specified above, the optical fiber 15 presented, at the same wavelength, attenuation due to hydrogen that went from 0.05 dB/km to 0.1 dB/km, which corresponds to attenuation increasing to a smaller extent.

EXAMPLE 2

Using Calcium Fluoride

The proportion of calcium fluoride $CaF_2$ particles used was 30 ppm by weight of the fluorided element, calcium, relative to natural silica, in order to build up the primary preform 24 which had its tube 22 made of ultra pure silica. Under such conditions, the built-up layer 23 had viscosity, during hot drawing, that was substantially equal to that of the tube 22 of the primary preform 24.

Provision was made to use calcium fluoride particles of ultra pure quality having a maximum size that was typically a few micrometers (μm). Calcium fluoride particles were used that were preferably of a size that was smaller than 10 μm so as to enhance uniform distribution of the particles in the build-up layer 23.

Figure 5:
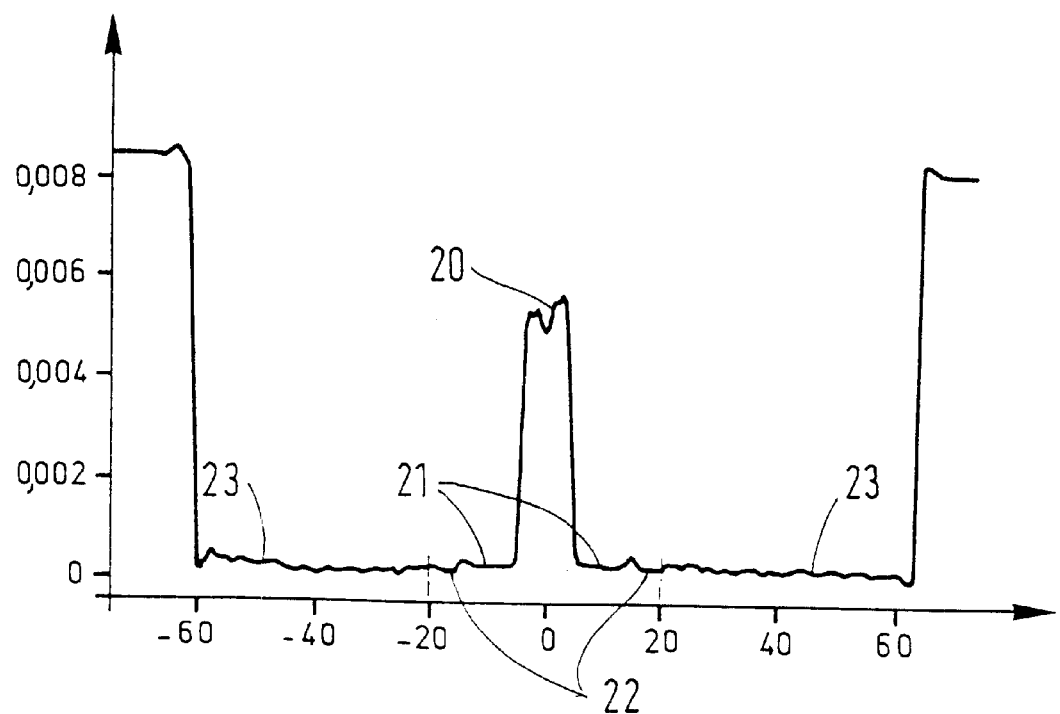
FIG. 5 shows the index profile of an optical fiber hot drawn from a preform having a silica-based outer deposition layer doped with calcium fluoride, in accordance with the invention.

FIG. 5 gives a refractive index profile along a diameter of an optical fiber 15 where the optical fiber 15 was hot drawn from a built-up primary preform 3. The silica tube 22 of the primary preform 24 contained 1200 parts per million (ppm) of chlorine, and the build-up layer 23 was made of grains of natural silica.

In this second example, as shown in FIG. 5, where the index profiles of the portions 20, 21, 22, and 23 of the optical fiber 15 are shown in the same manner as in FIG. 3, the natural silica grains in the build-up layer 23 were doped to 30 ppm with calcium fluoride that was delivered in the form of calcium fluoride particles. It can be seen that the index profile is substantially flat at about 20 μm from the center of the optical fiber 15, and the index step that can be seen in FIG. 3 has substantially disappeared. This result shows the influence of the calcium fluoride included in the buildup layer 23 on conserving the same refractive index between the thicknesses of the optical fiber 15 that are scaled from said build-up layer 23 and from the silica tube 22 of the primary preform 24 during hot drawing.

Provision is also made to introduce particles of calcium fluoride in the form of grains of synthetic silica highly doped in calcium fluoride, thereby making it possible to incorporate the calcium fluoride in a silica lattice prior to deposition, thus improving the uniformity of the build-up layer 23.

It should be observed that whatever the dopant used in the method of the invention, the introduction of dopant particles is compatible with fluorination treatment of the grains of natural silica.

What is claimed is:

1. A method of manufacturing an optical fiber preform (3) comprising: forming at least one silica-based outer deposition layer (23) by depositing silica, in the presence of a plasma torch, on a primary preform (24) constituted by a bar mainly comprising silica and including a silica-based outer peripheral portion (22), the method being characterized in that the viscosity of the outer deposition layer (23) is adjusted to be substantially identical to the viscosity of the outer peripheral portion (22) of the primary preform (24) by adding to the silica in the presence of the plasma torch, over a substantial portion of the outer deposition layer (23), at least one compound being a dopant selected from the group consisting of $CaF_2$, $MgF_2$, $AlF_3$, $B_2O_3$, and $Al_2O_3$.

2. A method according to claim 1, wherein the dopant is selected from the group consisting of $CaF_2$, $MgF_2$, and $AlF_3$, and wherein the proportion of the dopant lies in the range 5 ppm to 100 ppm by weight of the flourided element relative to silica.

3. A method according to claim 1, wherein the dopant is selected from the group consisting of $B_2O_3$, and $Al_2O_3$, and wherein the proportion of the dopant lies in the range 0.01% to 1% by weight of the oxidized element relative to silica.

4. A method according to claim 1, such that the silica deposited on the primary preform to form the outer deposition layer comprises grains having a width substantially within the range of 50 μm to 300 μm.

5. A method according to claim 1, such that the silica-based outer peripheral portion of the primary preform (24) is a tube of ultra pure silica.

6. A method of manufacturing an optical fiber preform comprising: forming at least one silica-based outer deposition layer by depositing silica, in the presence of a plasma torch, on a primary preform constituted by a bar mainly comprising silica and including a silica-based outer peripheral portion, the method being characterized in that the viscosity of the outer deposition layer is adjusted to be substantially identical to the viscosity of the outer peripheral portion of the primary preform by adding a dopant to the silica in the presence of the plasma torch over a substantial portion of the outer deposition layer.

7. A method of manufacturing an optical fiber preform comprising:

forming at least one silica-based outer deposition layer by depositing doped silica, in the presence of a plasma torch, on a primary preform constituted by a bar mainly comprising silica and including a silica-based outer peripheral portion, wherein the depositing of the doped silica is performed over a substantial portion of the outer deposition layer; and wherein the viscosity of the outer deposition layer is adjusted to be substantially identical to the viscosity of the outer peripheral portion of the primary preform by adding a dopant to silica to obtain the doped silica.

* * * * *